United States Patent
Parikh et al.

(10) Patent No.: US 10,075,454 B1
(45) Date of Patent: Sep. 11, 2018

(54) USING TELEMETRY DATA TO DETECT FALSE POSITIVES

(71) Applicant: Symantec Corporation, Mountain View, CA (US)

(72) Inventors: Jugal Parikh, Sunnyvale, CA (US); Sandeep Bhatkar, Sunnyvale, CA (US)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 14/675,443

(22) Filed: Mar. 31, 2015

(51) Int. Cl.
*H04L 29/06* (2006.01)

(52) U.S. Cl.
CPC ................ *H04L 63/1408* (2013.01)

(58) Field of Classification Search
CPC ............ H04L 63/1408; H04L 63/1425; H04L 63/0227
See application file for complete search history.

(56) References Cited

U.S. PATENT DOCUMENTS

| | | | |
|---|---|---|---|
| 7,392,544 B1 * | 6/2008 | Pavlyushchik | G06F 21/562 713/187 |
| 7,640,589 B1 * | 12/2009 | Mashevsky | G06F 21/56 726/24 |
| 7,757,292 B1 * | 7/2010 | Renert | G06F 21/562 726/22 |
| 8,239,948 B1 * | 8/2012 | Griffin | H04L 63/1416 726/22 |
| 8,627,469 B1 * | 1/2014 | Chen | G06F 21/567 726/22 |
| 8,719,935 B2 | 5/2014 | Polyakov et al. | |
| 2011/0126286 A1 * | 5/2011 | Nazarov | G06F 21/564 726/24 |
| 2012/0066759 A1 * | 3/2012 | Chen | G06F 21/554 726/15 |
| 2012/0084865 A1 * | 4/2012 | Niemela | G06F 21/563 726/24 |
| 2012/0167219 A1 * | 6/2012 | Zaitsev | G06F 21/56 726/24 |
| 2012/0227105 A1 * | 9/2012 | Friedrichs | H04L 63/1416 726/22 |

(Continued)

OTHER PUBLICATIONS

"File Detection Test of Malicious Software." Anti-Virus Comparative, Sep. 2013 (10 pages).

(Continued)

*Primary Examiner* — Carl G Colin
*Assistant Examiner* — Vance M Little
(74) *Attorney, Agent, or Firm* — Patent Law Works LLP

(57) ABSTRACT

Telemetry data concerning multiple samples convicted as malware by different endpoints is tracked over time. During a period of time in which telemetry data concerning convicted samples are tracked, specific samples can be convicted multiple times, both on a single endpoint and/or on multiple endpoints. The tracked telemetry data concerning the convicted samples is analyzed, and data that is indicative of false positives is identified. Convictions of samples can be exonerated as false positives, based on the results of analyzing the tracked telemetry data. More specifically, multiple data points from the tracked telemetry data that comprise evidence of false positives can be quantified and weighted. Where the evidence of false positives exceeds a given threshold, convictions of a given sample can be exonerated.

19 Claims, 4 Drawing Sheets

(56) References Cited

U.S. PATENT DOCUMENTS

2015/0365427 A1* 12/2015 Ben-Shalom .......... G06F 21/55
726/23

OTHER PUBLICATIONS

Ramzan, Zulfikar et al., "Reputation-based Security: An Analysis of Real World Effectiveness." Symantec White Paper, 2010 (9 pages).
Mishra, Umakant, "Finding and Solving Contradictions of False Positives in Virus Scanning." May 19, 2013 (13 pages).
Stalmans, E. et al., "A framework for DNS based detection and mitigation of malware infections on a network." Information Security South Africa, Aug. 15-17, 2011 (8 pages).

* cited by examiner

US 10,075,454 B1

USING TELEMETRY DATA TO DETECT FALSE POSITIVES

TECHNICAL FIELD

This disclosure pertains generally to computer security, and more specifically to using telemetry data to detect false positives generated by an antimalware program.

BACKGROUND

Computers are vulnerable to malware such as viruses, worms and Trojans. Antimalware software is often deployed on computers of both organizations and individuals, in order to detect and block malware before it infects or otherwise harms the target computers. When attempting to detect malware, antimalware programs sometime generate false positives (i.e., adjudicating a file or site to be malicious when in fact it is benign). False positives can occur for various reasons, such as use of a faulty malware signature, programming error and/or aggressive heuristic techniques. A false positive is at the very least annoying to the customer, and can even render a legitimate application or the computer's operating system unusable. For customers, this can lead to system downtime, data-loss, and lack of trust in the antimalware software vendor. For the antimalware vendor, this can result in negative publicity, loss of business, and perhaps even legal action.

A typical antimalware product with a large install base can generate several thousand false positives every day. The vast majority of these false positives typically remain undetected for months. While complete prevention of false positives is not realistic, early detection of false positives being generated by an antimalware program could minimize the negative impact. However, conventional false positive detection is a manual and time consuming process performed by human analysts. Conventional analysis is also reactive, being performed by the analysts only when customers report false positives to the vendor.

It would be desirable to address these issues.

SUMMARY

Telemetry data concerning multiple samples convicted as malware by different ones of a plurality of endpoint computers is tracked over time, so as to detect samples that were falsely convicted (i.e., false positives). During a period of time in which telemetry data concerning the convicted samples are tracked, specific samples can be convicted multiple times, both on a single endpoint and/or on multiple endpoints. The tracked telemetry data concerning the convicted samples is analyzed, and data that is indicative of false positives is identified. For example, statistical analysis can be performed on the tracked telemetry data, in order to identify statistical patterns indicative of false positives.

One specific example is tracking multiple conviction incidences of a specific sample over a period of time, and identifying changes in the conviction rate indicative of false positives. Another example is tracking different types of convictions (e.g., convictions that result in the blocking of a file as opposed to those manually restored from quarantine), and identifying percentages or other quantification of specific conviction types indicative of false positives. File/path names and/or URLS of samples can be tracked over time, identifying the level of consistency thereof. Other examples of possible tracked data points include but are not limited to trust statuses of folders in which samples are located, changes in file reputations, types of detection technology and/or signatures used to convict samples, sources from which samples originate, whether instances of samples are signed and the number of operating systems on which samples are detected.

Convictions of samples can be exonerated as false positives, based on the results of analyzing the tracked telemetry data. More specifically, multiple data points from the tracked telemetry data that comprise evidence of false positives can be quantified and weighted. Where the evidence of false positives exceeds a given threshold, convictions of a given sample can be exonerated. The tracked telemetry data concerning conviction incidences of specific samples over the period of time can also be provided as input to a machine learning engine or the like.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
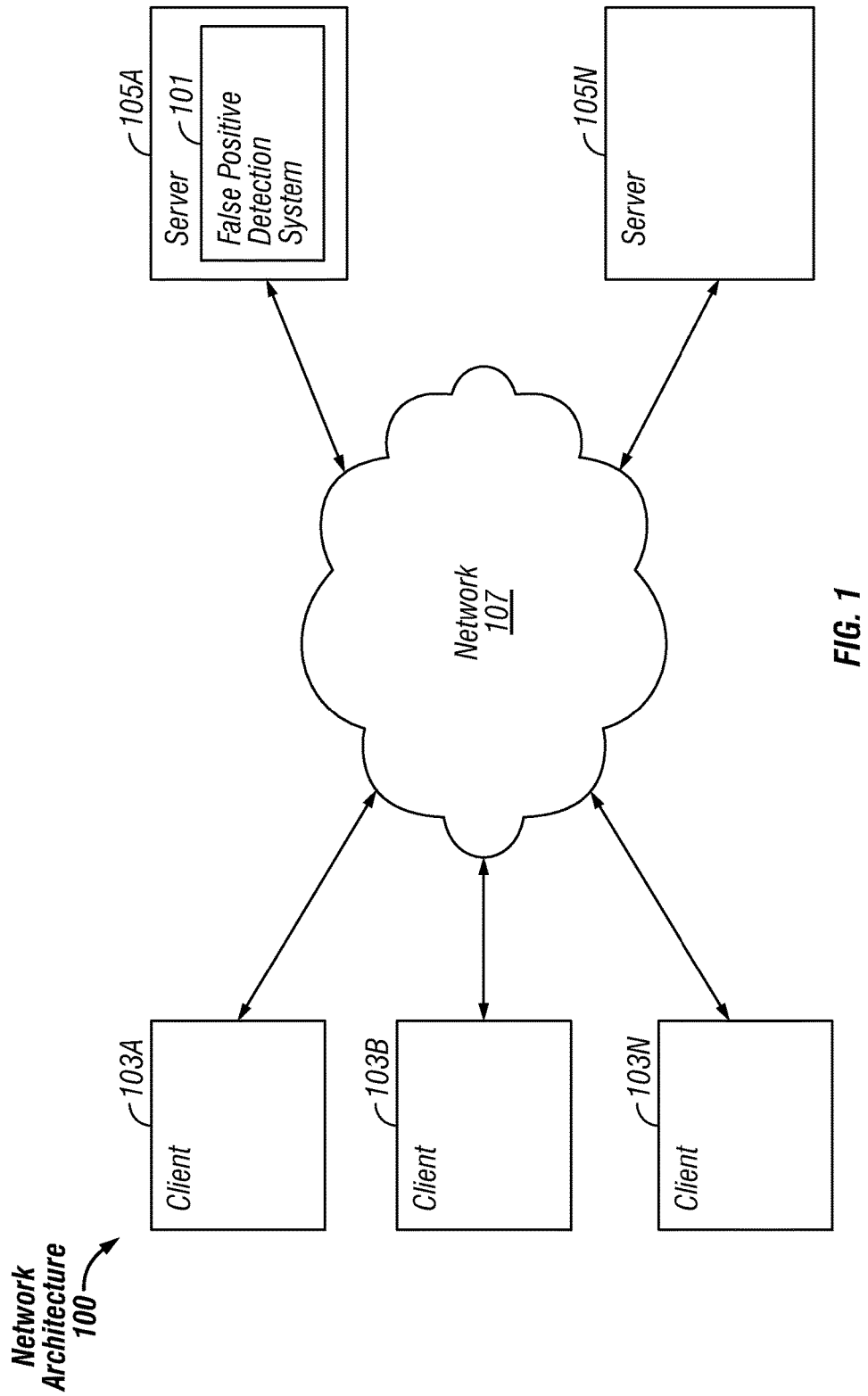
FIG. 1 is a block diagram of an exemplary network architecture in which a false positive detection system can be implemented, according to some embodiments.

FIG. 1 is a block diagram illustrating an exemplary network architecture 100 in which a false positive detection system 101 can be implemented. The illustrated network architecture 100 comprises multiple clients 103A, 103B and 103N, as well as multiple servers 105A and 105N. In FIG. 1, the false positive detection system 101 is illustrated as residing on server 105A. It is to be understood that this is an example only, and in various embodiments various functionalities of this system 101 can be instantiated on a client 103, a server 105, or can be distributed between multiple clients 103 and/or servers 105.

Clients 103 and servers 105 can be implemented using computer systems 210 such as the one illustrated in FIG. 2 and described below. The clients 103 and servers 105 are communicatively coupled to a network 107, for example via a network interface 248 or modem 247 as described below in conjunction with FIG. 2. Clients 103 are able to access applications and/or data on servers 105 using, for example, a web browser or other client software (not shown). Clients 103 can but need not be in the form of mobile computing devices, comprising portable computer systems 210 capable of connecting to a network 107 and running applications. Such mobile computing devices are sometimes referred to as smartphones, although many mobile phones not so designated also have these capabilities. Tablet computers and laptop computers are other examples of mobile computing devices.

Although FIG. 1 illustrates three clients 103 and two servers 105 as an example, in practice many more (or fewer) clients 103 and/or servers 105 can be deployed. In one embodiment, the network 107 is in the form of the Internet. Other networks 107 or network-based environments can be used in other embodiments.

Figure 2:
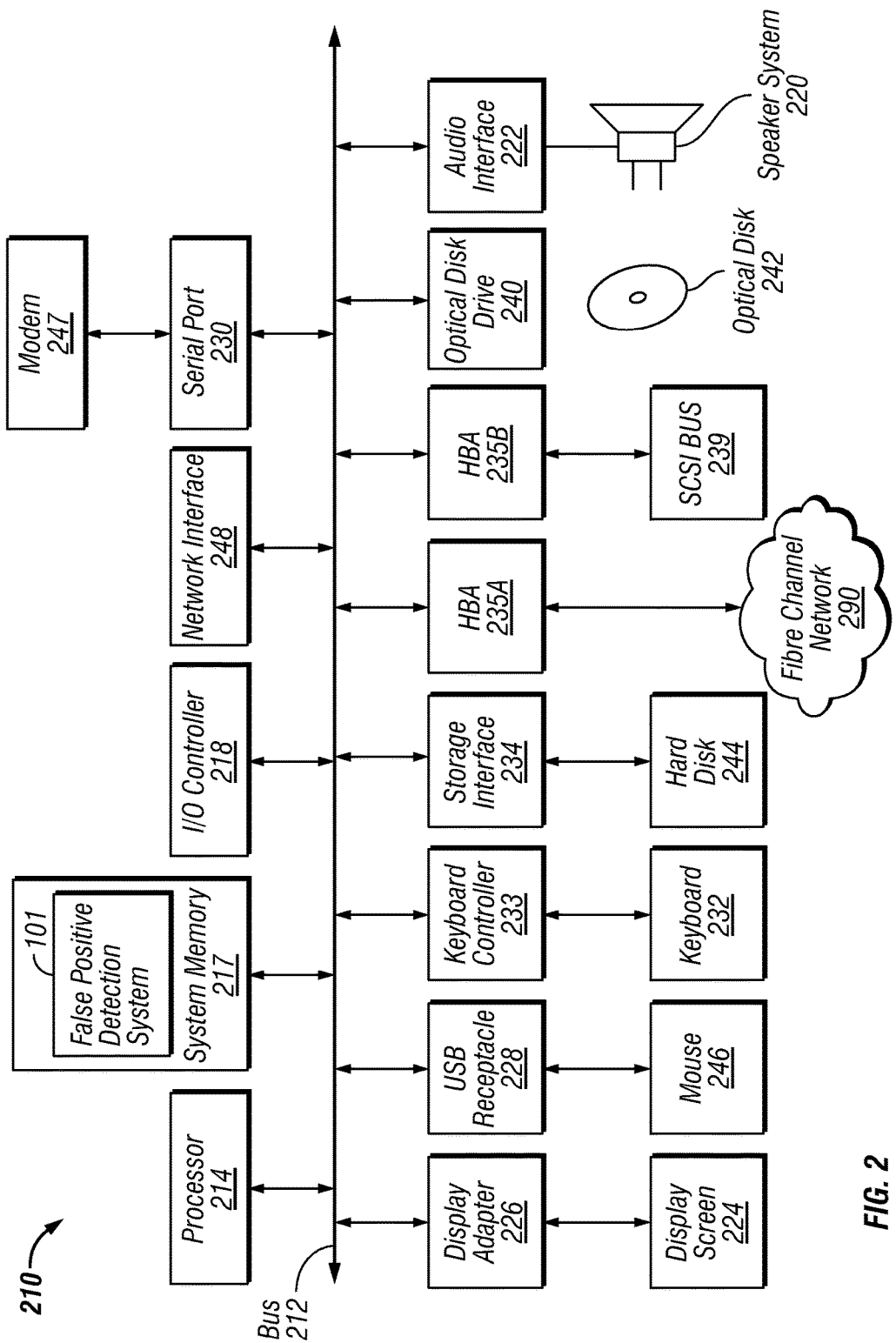
FIG. 2 is a block diagram of a computer system suitable for implementing a false positive detection system, according to some embodiments.

FIG. 2 is a block diagram of a computer system 210 suitable for implementing a false positive detection system 101. Clients 103 and servers 105 can all be implemented in the form of such computer systems 210. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory, an input/output (I/O) controller 218, an audio output interface 222 communicatively coupled to an audio output device such as a speaker 220, a display adapter 226 communicatively coupled to a video output device such as a display screen 224, one or more interfaces such as Universal Serial Bus (USB) ports 228, serial ports 230, parallel ports (not illustrated), etc., a keyboard controller 233 communicatively coupled to a keyboard 232, a storage interface 234 communicatively coupled to one or more hard disk(s) 244 (or other form(s) of storage media), a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212, e.g., via a USB port 228, a modem 247 coupled to bus 212, e.g., via a serial port 230, and one or more wired and/or wireless network interface(s) 248 coupled, e.g., directly to bus 212.

Other components (not illustrated) may be connected in a similar manner (e.g., document scanners, digital cameras, printers, etc.). Conversely, all of the components illustrated in FIG. 2 need not be present (e.g., smartphones and tablets typically do not have optical disk drives 240, external keyboards 242 or external pointing devices 246, although various external components can be coupled to mobile computing devices via, e.g., USB ports 228). In different embodiments the various components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242, flash memory) and loaded into system memory 217 and executed by the processor 214. Application programs can also be loaded into system memory 217 from a remote location (i.e., a remotely located computer system 210), for example via the network interface 248. In FIG. 2, the false positive detection system 101 is illustrated as residing in system memory 217. The workings of the false positive detection system 101 are explained in greater detail below in conjunction with FIG. 3.

The storage interface 234 is coupled to one or more hard disks 244 (and/or other standard storage media). The hard disk(s) 244 may be a part of computer system 210, or may be physically separate and accessed through other interface systems.

The network interface 248 and/or modem 247 can be directly or indirectly communicatively coupled to a network 107 such as the internet. Such coupling can be wired or wireless.

Figure 3:
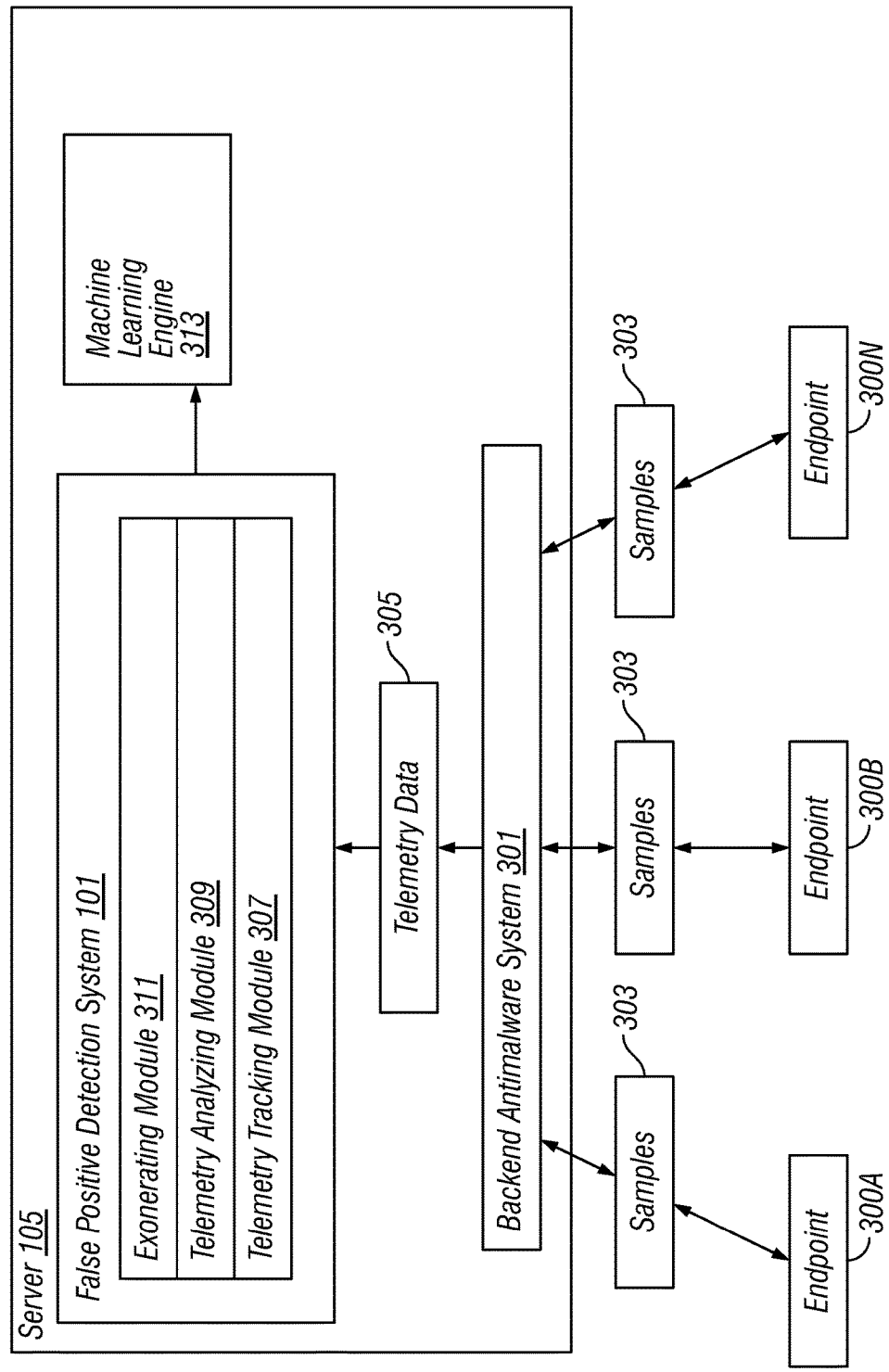
FIG. 3 is a high level block diagram of the operation of a false positive detection system, according to some embodiments.

FIG. 3 illustrates the operation of a false positive detection system 101 running on a server 105. As described above, the functionalities of the false positive detection system 101 can reside on specific computers 210 or be otherwise distributed between multiple computer systems 210, including within a fabric/cloud-based computing environment in which the functionality of the false positive detection system 101 is provided as a service over a network 107. It is to be understood that although the false positive detection system 101 is illustrated in FIG. 3 as a single entity, the illustrated false positive detection system 101 represents a collection of functionalities, which can be instantiated as a single or multiple modules as desired (instantiation of a specific, multiple module false positive detection system 101 is illustrated in FIG. 3). It is to be understood that the modules of the false positive detection system 101 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client computer," "server computer" and "computing device" mean one or more computers configured and/or programmed to execute the described functionality. Additionally, program code to implement the functionalities of the false positive detection system 101 can be stored on computer-readable storage media. Any form of tangible computer readable storage medium can be used in this context, such as magnetic, optical or solid state storage media. As used herein, the term "computer readable storage medium" does not mean an electrical signal separate from an underlying physical medium.

As illustrated in FIG. 3, the false positive detection system 101 runs in conjunction with a backend (server side) component of an antimalware system 301. In FIG. 3, the false positive detection system 101 is depicted as a separate entity that is communicatively coupled with the backend antimalware system 301. It is to be understood that in some embodiments, the false positive detection system 101 can be instantiated as a component of the antimalware system 301. The antimalware system 301 and false positive detection system 101 are illustrated as residing on the same server 105, although the functionalities associated with one or both of these components can be distributed across multiple computers 210 at a single or multiple locations as desired.

The centralized backend component of the antimalware system 301 communicates with a large number of endpoint computers 300 on which the client level components of the antimalware system 301 are installed (client components not illustrated). These endpoints 300 are the computer systems 210 of the customers of the antimalware system 301 vendor. Although FIG. 3 only depicts three endpoints 300 for clarity of illustration, it is to be understood that in practice the centralized backend antimalware system 301 can communicate with orders of magnitude more endpoints 300 (e.g., hundreds, thousands, tens of thousands, etc.), depending on the size of the installed customer base.

The backend component of the antimalware system 301 provides new malware signatures, software updates and other current information to endpoints 300. The endpoints 300 provide information concerning their malware screening activities to the centralized server side component of the antimalware system 301, including samples 303 that the endpoints 300 convict as being malicious. The objects convicted as malicious at an endpoint level can comprise files or other forms of digital content adjudicated to comprise malware. In many instances, the samples 303 provided to the backend component of the antimalware system 301 comprise hashes of the convicted content, although under some circumstances the actual content can be provided as desired. As explained above, a certain number of the convictions of the samples 303 are actually false positives (i.e., some of the convicted samples 303 are actually benign, and were erroneously convicted).

In order to detect false positives, the false positive detection system 101 tracks telemetry data 305 concerning convicted samples 303 over time. As discussed in more detail below, as the same samples 303 are convicted multiple times by multiple endpoints 300, the false positive detection system 101 is able to detect changes in the telemetry data 305 for specific samples 303 over time (e.g., how often the sample 303 is convicted on endpoints 300 in the field, the file path and/or URL of the convicted sample 303 on different endpoints 300, the type of detection technology used on the endpoints 300, etc.). Specific types of changes or spikes in the telemetry data 305 concerning a given sample 303 are indicative of false positives. The false positive detection system 101 can exonerate convictions of specific samples 303 as comprising false positives based on this analysis, and provide the results of this analysis over time as input to heuristics and/or AI engines.

More specifically, a telemetry tracking module 307 of the false positive detection system 101 tracks telemetry data 305 concerning convicted samples 303 received by the backend antimalware system 301. As the term is used herein, "telemetry data" 305 concerning a sample 303 can comprise any data considered germane to an analysis as to whether a conviction of the sample 303 is a false positive. Specific examples of telemetry data 305 are discussed in detail below. It is to be understood that telemetry data 305 can be explicitly supplied by the endpoints 300, gleaned by the backend antimalware system 301 and/or inferred by the false positive detection system 101, depending upon the nature of the specific telemetry data 305.

One example of telemetry data 305 concerning samples 303 is conviction incidences. Whenever a given sample 303 is convicted as malware on an endpoint 300, the backend antimalware system 301 is informed. A specific sample 303 can have multiple convictions corresponding to detection on multiple endpoints 300, and/or multiple conviction occurrences on a single endpoint 300. The telemetry tracking module 307 can track, for example, the fact that the specific sample 303 was convicted, the time of each conviction and the endpoint 300 on which each conviction occurred.

As described in more detail below, specific types of changes in telemetry data 305 can be interpreted as being indicative of false positives. For example, in the case of conviction incidences, changes in the conviction rate, such as sudden spikes or bursts in the number of conviction incidences for a specific sample 303 can be indicative of the conviction being a false positive. As explained in detail below, actual decisions to exonerate convictions can be made based on analysis of a variety of factors extracted from corresponding telemetry data 305. The specific factors analyzed, the relative weight given to different factors, and thresholds used to exonerate given convictions as false positives based on such analysis are variable design parameters. The working of the telemetry analyzing module 309 and the exonerating module 311 of the false positive detection system 101 are described in detail below.

Returning to the example of convictions, the telemetry analyzing module 309 can analyze the convictions tracked by the telemetry tracking module 307, looking for spikes or other anomalous conviction rate activity that is indicative of false positives. More specifically, statistical analysis can be performed on the telemetry data tracked over a period of time, in order to identify statistical patterns indicative of false positives. Examples of statistical analyses the telemetry analyzing module 309 can perform to look for such activity is to calculate (i) the average number of convictions of a given sample 303 per a fixed period of time (e.g., per hour, per day, per week); (ii) the standard deviation of the number of convictions per time period; (iii) the total number of convictions of the sample 303; (iv) the number of days on which at least one conviction of the sample 303 was observed (P); (v) the number of days between the first and last day on which at least one conviction of the sample 303 was observed (D); (vi) the percentage of days on which at least one conviction of the sample 303 was observed=100* (P/D), etc. It is to be understood that these are just examples of the type of analysis that can be performed to detect spikes and bursts in the conviction of a given sample 303.

In some embodiments, the telemetry tracking module 307 also tracks the type of each conviction, with the conviction types being (i) a conviction leading to a subsequent quarantine of the sample 303 (referred to herein as a blocking conviction); (ii) a conviction incidence in which the corresponding quarantined sample 303 is manually restored by a user (referred to herein as a restored conviction); and (iii) a non-blocking incidence in which the conviction of the sample 303 does not result in the sample 303 being quarantined on the endpoint 300 (a non-blocking conviction). A non-blocking conviction can occur because, for example, the conviction was automatically exonerated based on some predefined criteria such as a whitelist, or the detection was performed using a signature under development being beta-tested or the like. For convictions of a given sample 303, higher percentages of blocking convictions are indicative of true positives, whereas higher percentages of restored and/or non-blocking convictions are indicative of false positives. To this end, the telemetry analyzing module 309 can capture these behaviors over time by analyzing the tracked telemetry and calculating information such as, for all of the convictions of a given sample 303 over a period of time (e.g., a day, a week, a month), the percentage of blocking convictions, restored convictions and non-blocking convictions.

Another example of telemetry data 305 that can be tracked is the path name of a convicted file. This is relevant because clean, legitimate files tend to have the same or similar path name over time and on different computers 210, whereas a malicious file tends to utilize different names and paths on different targets as a form of obfuscation. Because consistent path names are a sign of legitimacy, a specific convicted sample 303 that has the same or very similar path name on multiple endpoints 300 over time could be a false positive. On the other hand, having different file/path names over time and between targets is evidence that a convicted sample 303 is malicious. The telemetry analyzing module 309 can thus analyze trends such as the frequency of changes in the path at which a given sample 303 is located when the sample 303 is convicted. In other words, the telemetry analyzing module 309 can determine whether a given sample 303 tends over time to be located in the same folder (evidence of legitimacy) or whether it moves between locations frequently (evidence of maliciousness).

Another characteristic of path names that is indicative of true versus false positives is the trust status of the folder. This is so because clean files tend to be stored in trusted folders (e.g., on a Windows computer folders such as system32, program files, windows, etc.). On the other hand, malware often attempts to inject itself in folders it creates itself or in which it may go unnoticed. Thus, the telemetry analyzing module 309 can calculate factors such as the percentage of convictions of given samples 303 in which the file was located in one of a predefined list of trusted folders (this list would vary between operating systems and embodiments).

As part of conventional antimalware analysis, various factors are taken into account when determining how likely a particular instance of a file is to be malicious at a particular point in time. These factors include things such as whitelisting or blacklisting, the prevalence of the file, the source of the file, past infections or other indications concerning the particular endpoint 300 on which the file is detected, etc. As part of conventional malware analysis, the combination of such factors can be conceived of as the reputation of the file. Although conventional analysis uses a calculated reputation at a particular point in time, the telemetry tracking module 307 can track the reputation of a given sample 303 over time, based on multiple conviction instances. In other embodiments, the telemetry tracking module 307 tracks some or all of the factors that go into a file's reputation individually instead of or in addition to tracking the reputation. In either case, extreme changes in reputation (or individual reputation determining factors) can be indicative of false positives, so in some embodiments the telemetry analyzing module 309 analyzes this type of tracked telemetry data 305, and identifies and quantifies such changes over time.

Another telemetry data point that is tracked by the telemetry tracking module 307 in some embodiments is the type of detection technology used to convict the samples 303 (e.g., the specific antimalware engine and/or methodology used to make convictions). This is so because some detection technologies are more prone to false positives than others. For example, heuristic analysis has a higher rate of false positives than signature based virus detection, and different heuristics algorithms with varying degrees of accuracy produce different levels of false positives. The telemetry analyzing module 309 can thus analyze such tracked telemetry data 305 looking at factors such as the total number of convictions per sample 303 made by each specific detection technology in use by the antimalware system 301, and the percentage of those convictions made by those detections technologies with higher and lesser rates of accuracy.

Another example of telemetry data 305 that can be tracked and analyzed are instances, numbers and percentages of convictions of a given sample 303 made using manually generated signatures versus automatically generated signatures. This is relevant because manually generated signatures tend to produce fewer false positives (e.g., are more accurate) than automatically generated ones. Yet another example is the source of the sample 303 (e.g., percentage downloaded from specific portals with varying historical rates of distribution of infected files).

Other factors that can be tracked and analyzed include an indication of whether instances of samples 303 are signed or not (signed files are more likely to be benign), the Uniform Resource Locators at which sample 303 originate (like file name/path described above, consistency of the URL can be indicative of false positives), and the number of different operating systems on which a sample 303 was detected (a sample 303 appearing on one OS only is more likely to be malicious). Of course, these and the other telemetry data points discussed above are only examples, and in different embodiments other telemetry data 305 are tracked and/or analyzed as desired. The specific statistical analyses described above are also just embodiment specific examples, and other statistical methodologies are applied to the tracked telemetry data 305 in other embodiments as desired.

In some embodiments, the exonerating module 311 exonerates certain convictions as comprising false positives, based on the analysis of tracked telemetry data 305 over time. In such adjudications, different factors and telemetry data points can be weighted differently as evidence of false positives. When the analysis indicates that a given sample 303 is being convicted over a given period of time according to criteria that indicate a false positive to a quantified extent that exceeds a given threshold, the exonerating module 311 can exonerate the convictions. Under these circumstances, the exonerating module 311 can, for example, update the antimalware system 301 accordingly, or take other responsive action as desired. In making such a determination, the exonerating module 311 can quantify the results of the analysis of the tracked telemetry data 305 concerning the convictions of a specific sample 303 over time, and determine whether the resulting weighted total exceeds a predetermined threshold. The relative weights to apply to given analyzed factors concerning various telemetry data points indicative of false positives is a variable design parameter, as are the specific threshold values to utilize.

In some embodiments, data gleaned by the false positive detection system 101 is input into a machine learning engine 313, such as a heuristics or artificial intelligence system. The machine learning engine 313 can then use this information as ground truth training data. Input provided by the false positive detection system 101 comprises captured observations concerning the same sample 303 over multiple conviction instances, which provides an advantage over a single time instance as typically used in machine learning approaches.

In conclusion, the false positive detection system 101 can extract a rich variety of information from the entire history of harvested telemetry data 305 concerning convicted samples 303, rather than relying on a single observation at a given point in time. For instance, the false positive detection system 101 derives information concerning how the characteristics that are potentially indicative of a false positive change throughout a file's existence, rather than simply using the current data at the time of a single conviction.

Figure 4:
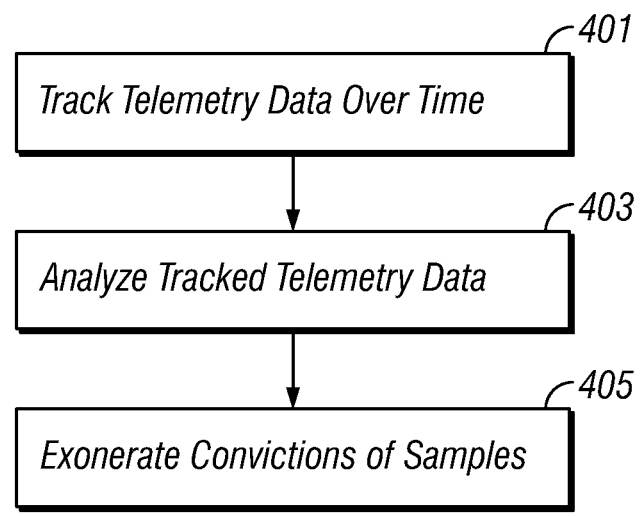
FIG. 4 is a flow chart showing steps for the operation of a false positive detection system, according to some embodiments.

FIG. 4 illustrates steps performed during the operation of the false positive detection system 101, according to some embodiments. The telemetry tracking module 307 tracks 401 telemetry data 405 concerning multiples samples 303 convicted as comprising malware by different ones of a plurality of endpoints 300, over a period of time. The telemetry analyzing module 309 analyzes 403 tracked telemetry data 305 concerning the convicted samples 303 that is indicative of whether convictions of specific ones of the samples 303 comprise false positives. Where evidence that the conviction(s) of a given sample 303 exceed a threshold, the exonerating module 311 exonerates 405 the conviction(s) as being false positives.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method for using telemetry data tracked over time concerning a plurality of samples convicted as comprising malware by different ones of a plurality of endpoint computers, to detect samples that were falsely convicted, the method comprising:
   tracking, by a central computer, telemetry data concerning the plurality of samples convicted as comprising malware by utilizing specific anti-malware technologies by different ones of the plurality of endpoint computers, wherein the tracking occurs over a fixed period of time during which a specific sample is convicted as comprising malware more than once by a single endpoint of the plurality of endpoint computers, the tracking further comprising identifying patterns indicative of a false positive conviction of the specific sample during the fixed period of time;
   analyzing tracked telemetry data concerning convicted samples, by the central computer, wherein the analyzed tracked telemetry data is indicative of whether convictions of specific ones of the samples comprise false positives, the analyzing further comprising computing one or more of:
      an average number of convictions of the specific sample over the fixed period of time;
      a standard deviation of a number of convictions of the specific sample over the fixed period of time;
      a time duration between a first conviction of the specific sample and a subsequent conviction of the specific sample during the fixed period of time;
   exonerating at least one conviction of at least one sample as comprising a false positive, by the central computer, based on results of analyzing of tracked telemetry data concerning the samples convicted as comprising malware; and
   updating an anti-malware system to account for the at least one exonerated conviction of the at least one sample as comprising a false positive, based on analyzed tracked telemetry data indicative of convictions of specific ones of the samples comprising false positives.

2. The method of claim 1 wherein tracking telemetry data concerning the plurality of samples convicted as comprising malware by different ones of the plurality of endpoint computers, wherein the tracking occurs over the fixed period of time during which the specific sample is convicted as comprising malware more than once, further comprises:
   tracking telemetry data over the fixed period of time concerning a plurality of the specific sample that, during the fixed period of time, is convicted as comprising malware by multiple ones of the plurality of endpoint computers.

3. The method of claim 1 wherein analyzing tracked telemetry data concerning the convicted samples, wherein the analyzed tracked telemetry data is indicative of whether convictions of specific ones of the samples comprise false positives, further comprises:
   performing statistical analysis on the telemetry data tracked over the fixed period of time; and
   identifying statistical patterns in the tracked telemetry data indicative of false positives.

4. The method of claim 1 further comprising:
   tracking multiple conviction incidences of a specific one of the plurality of samples, during the fixed period of time, and
   identifying changes in a conviction rate for the specific sample during the fixed period of time, the changes in the conviction rate being indicative of false positives.

5. The method of claim 1 further comprising:
   tracking different types of convictions of a specific one of the plurality of samples, during the fixed period of time; and
   identifying a percentage of a specific type of conviction for the specific sample during the fixed period of time, the percentage of the specific type of conviction being indicative of false positives.

6. The method of claim 1 further comprising:
   tracking a path and file name of a specific one of the plurality of convicted samples during the fixed period of time; and
   identifying a consistency of the path and file name of the specific convicted sample during the period of time as being indicative of false positives.

7. The method of claim 1 further comprising:
   tracking a uniform resource locator of a specific one of the plurality of convicted samples during the fixed period of time; and
   identifying a consistency of the uniform resource locator of the specified convicted sample during the fixed period of time as being indicative of false positives.

8. The method of claim 1 further comprising:
   tracking folders in which specific ones of the plurality of convicted samples are located during the fixed period of time; and
   identifying trust statuses of folders in which specific convicted samples are located during the fixed period of time as being indicative of false positives.

9. The method of claim 1 further comprising:
   tracking telemetry data indicative of file reputation of specific ones of the plurality of convicted samples during the fixed period of time; and
   identifying changes in file reputations of specific convicted samples during the fixed period of time as being indicative of false positives.

10. The method of claim 1 further comprising:
    tracking types of detection technology used to convict a specific one of the plurality of samples, during the fixed period of time; and
    identifying a percentage of a type of detection technology used to convict the specific sample during the specific period of time, the percentage of the type of detection technology used to convict the specific sample being indicative of false positives.

11. The method of claim 1 further comprising:
tracking types of signatures used to convict a specific one of the plurality of samples, during the fixed period of time; and
identifying a percentage of a type of signature used to convict the specific sample during the fixed period of time, the percentage of the type of signature used to convict the specific sample being indicative of false positives.

12. The method of claim 1 further comprising:
tracking sources from which a specific one of the plurality of samples is obtained, during the fixed period of time; and
identifying a percentage of at least one source from which the specific sample is obtained during the fixed period of time, the percentage of the source being indicative of false positives.

13. The method of claim 1 further comprising:
tracking whether instances of a specific one of the plurality of samples is signed, during the fixed period of time; and
identifying a percentage of instances of the specific sample that are signed during the fixed period of time, the percentage being indicative of false positives.

14. The method of claim 1 further comprising:
tracking operating systems on which a specific one of the plurality of samples is detected, during the fixed period of time; and
identifying a number of operating systems on which the specific one of the plurality of samples is detected during the fixed period of time, the number being indicative of false positives.

15. The method of claim 1 wherein exonerating at least one conviction of at least one sample as comprising a false positive based on results of analyzing of tracked telemetry data concerning the convicted samples further comprises:
weighting multiple data points from the tracked telemetry data concerning the at least one conviction of the at least one sample, each of the multiple data points comprising evidence of false positives; and
responsive to evidence of false positives exceeding a given threshold, exonerating the at least one conviction of the at least one sample.

16. The method of claim 1 further comprising:
inputting tracked telemetry data concerning multiple conviction incidences of specific samples over a period of time into a machine learning engine.

17. At least one non-transitory computer readable medium for using telemetry data tracked over time concerning a plurality of samples convicted as comprising malware by different ones of a plurality of endpoint computers, to detect samples that were falsely convicted, the at least one non-transitory computer readable medium storing computer executable instructions that, when loaded into computer memory and executed by at least one processor of at least one computer device, cause the at least one computer device to perform the following steps:
tracking, by a central computer, telemetry data concerning the plurality of samples convicted as comprising malware by utilizing specific anti-malware technologies by different ones of the plurality of endpoint computers, wherein the tracking occurs over a fixed period of time during which a specific sample is convicted as comprising malware more than once by a single endpoint of the plurality of endpoint computers, the tracking further comprising identifying patterns indicative of a false positive conviction of the specific sample during the fixed period of time;
analyzing tracked telemetry data concerning convicted samples wherein the analyzed tracked telemetry data is indicative of whether convictions of specific ones of the samples comprise false positives, the analyzing further comprising computing one or more of:
an average number of convictions of the specific sample over the fixed period of time;
a standard deviation of a number of convictions of the specific sample over the fixed period of time;
a time duration between a first conviction of the specific sample and a subsequent conviction of the specific sample during the fixed period of time;
exonerating at least one conviction of at least one sample as comprising a false positive based on results of analyzing of tracked telemetry data concerning the samples convicted as comprising malware; and
updating an anti-malware system to account for the at least one exonerated conviction of the at least one sample as comprising a false positive, based on analyzed tracked telemetry data indicative of convictions of specific ones of the samples comprising false positives.

18. The at least one non-transitory computer readable medium of claim 17 further storing computer executable instructions for:
performing statistical analysis on the telemetry data tracked over the fixed period of time; and
identifying statistical patterns in the tracked telemetry data indicative of false positives.

19. A computer system for using telemetry data tracked over time concerning a plurality of samples convicted as comprising malware by different ones of a plurality of endpoint computers, to detect samples that were falsely convicted, the computer system comprising:
a processor;
system memory;
a telemetry tracking module residing in the system memory, the telemetry tracking module being programmed to track telemetry data concerning the plurality of samples convicted as comprising malware by utilizing specific anti-malware technologies by different ones of the plurality of endpoint computers, wherein the tracking occurs over a fixed period of time during which a specific sample is convicted as comprising malware more than once by a single endpoint of the plurality of endpoint computers, wherein to track telemetry data further comprises identifying patterns indicative of a false positive conviction of the specific sample during the fixed period of time;
a telemetry analyzing module residing in the system memory, the telemetry analyzing module being programmed to analyze tracked telemetry data concerning convicted samples wherein the analyzed tracked telemetry data is indicative of whether convictions of specific ones of the samples comprise false positives, wherein to analyze tracked telemetry data further comprises computing one or more of:
an average number of convictions of the specific sample over the fixed period of time;
a standard deviation of a number of convictions of the specific sample over the fixed period of time;

a time duration between a first conviction of the specific sample and a subsequent conviction of the specific sample during the fixed period of time;

an exonerating module residing in the system memory, the exonerating module being programmed to exonerate at least one conviction of at least one sample as comprising a false positive based on results of analyzing of tracked telemetry data concerning the samples convicted as comprising malware; and updating an anti-malware system to account for the at least one exonerated conviction of the at least one sample as comprising a false positive, based on analyzed tracked telemetry data indicative of convictions of specific ones of the samples comprising false positives.

* * * * *